(12) United States Patent
Crites et al.

(10) Patent No.: US 10,483,825 B2
(45) Date of Patent: Nov. 19, 2019

(54) ROTARY ACTUATOR

(71) Applicant: CTS Corporation, Elkhart, IN (US)

(72) Inventors: Derek L. Crites, Niles, MI (US);
Douglas E. Cors, Elkhart, IN (US);
David A. Kolberg, Granger, IN (US);
Andy Rutten, South Bend, IN (US)

(73) Assignee: CTS Corporation, Lisle, IL (US)

( * ) Notice: Subject to any disclaimer, the term of this patent is extended or adjusted under 35 U.S.C. 154(b) by 535 days.

(21) Appl. No.: 15/189,142

(22) Filed: Jun. 22, 2016

(65) Prior Publication Data

US 2016/0380509 A1 Dec. 29, 2016

Related U.S. Application Data

(60) Provisional application No. 62/184,130, filed on Jun. 24, 2015.

(51) Int. Cl.
| | |
|---|---|
| *H02K 5/00* | (2006.01) |
| *H02K 7/116* | (2006.01) |
| *H02K 11/215* | (2016.01) |
| *H02K 5/04* | (2006.01) |
| *H02K 5/22* | (2006.01) |

(52) U.S. Cl.
CPC ............ *H02K 7/116* (2013.01); *H02K 5/04* (2013.01); *H02K 5/225* (2013.01); *H02K 11/215* (2016.01)

(58) Field of Classification Search
CPC .......... H02K 5/225; H02K 5/04; H02K 7/116; H02K 11/215
USPC ............................................... 310/89, 83, 71
See application file for complete search history.

(56) References Cited

U.S. PATENT DOCUMENTS

| | | | |
|---|---|---|---|
| 3,163,109 A | 12/1964 | Stelling | |
| 4,495,856 A | 1/1985 | Sollami | |
| 5,024,116 A | 6/1991 | Kraft | |
| 5,219,393 A | 6/1993 | Niederstadt et al. | |
| 5,758,684 A | 6/1998 | Hudson et al. | |
| 5,928,241 A | 7/1999 | Menut et al. | |
| 6,317,332 B1 * | 11/2001 | Weber | B60R 16/0239 310/71 |
| 7,579,730 B2 * | 8/2009 | Sakohira | H02K 5/148 310/239 |
| 8,569,917 B2 * | 10/2013 | Tang | H02K 5/148 310/68 B |
| 2004/0216888 A1 | 11/2004 | Schmidt et al. | |

(Continued)

FOREIGN PATENT DOCUMENTS

| | | |
|---|---|---|
| AU | 2008264221 A | 7/2009 |
| DE | 102008053572 A1 | 4/2010 |
| EP | 1091144 A2 | 4/2001 |

*Primary Examiner* — Hanh N Nguyen
(74) *Attorney, Agent, or Firm* — Daniel Deneufbourg

(57) ABSTRACT

A rotary actuator includes a connector housing with a hollow tube, a separate motor housing clipped to one side of the connector housing, and a separate gear and sensor housing clipped to an opposed side of the connector housing. At least a first gear and a first gear carrier are located within the interior of the hollow tube. A motor shaft extends from the motor through the connector housing into the tube and into engagement with the first gear. A sensor is seated on an exterior surface of the hollow tube and a magnet is housed in the interior of the first gear carrier. The sensor is adapted to change changes in the magnetic field generated by the magnet in response to movement of the magnet.

6 Claims, 4 Drawing Sheets

(56) References Cited

U.S. PATENT DOCUMENTS

| | | |
|---|---|---|
| 2009/0108130 A1 | 4/2009 | Flatt |
| 2010/0210391 A1* | 8/2010 | Dinger .................... B64C 13/28 |
| | | 475/149 |
| 2011/0006617 A1 | 1/2011 | Budde et al. |
| 2011/0101809 A1 | 5/2011 | Weber |
| 2012/0161559 A1* | 6/2012 | Mizutani ................ H02K 5/148 |
| | | 310/71 |
| 2012/0286629 A1 | 11/2012 | Johnson et al. |
| 2014/0000394 A1 | 1/2014 | Anheier et al. |
| 2014/0020491 A1 | 1/2014 | Palfenier et al. |
| 2014/0021832 A1 | 1/2014 | Palfenier et al. |
| 2014/0110178 A1 | 4/2014 | Savage et al. |
| 2014/0151146 A1* | 6/2014 | Tanaka ................. B62D 5/0406 |
| | | 180/443 |
| 2014/0238229 A1 | 8/2014 | Sobolewski et al. |
| 2016/0134073 A1* | 5/2016 | Tokizaki ................ H02K 5/145 |
| | | 310/71 |

* cited by examiner

ROTARY ACTUATOR

CROSS-REFERENCE TO RELATED APPLICATION

This application claims the benefit of the filing date and disclosure of U.S. Provisional Patent Application Ser. No. 62/184,130 filed on Jun. 24, 2015, the contents of which are incorporated herein by reference as are all references cited therein.

FIELD OF THE INVENTION

The present invention relates to actuators in general and, in particular, to a rotary actuator.

BACKGROUND OF THE INVENTION

This invention relates to an actuator which can be used in a wide variety of applications to control the rotary motion of an apparatus or part including, for example, valves, switches, and indicators in an automobile. An actuator of the type forming the subject of this invention includes three main components: an electric motor; a gear assembly which couples the motor to the rotatable shaft of the apparatus or part; and a sensor and control assembly.

The present invention is directed to such an actuator with a modular housing that allows for a change in motor size and output shaft configuration.

SUMMARY OF THE INVENTION

The present invention is generally directed to a rotary actuator comprising a connector housing including a frame, a separate motor housing secured and extending outwardly from a first side of the frame of the connector housing and defining an interior adapted to house a motor, and a separate gear and sensor housing secured and extending outwardly from a second side of the frame of the connector housing opposed to the first side of the frame of the connector housing and defining an interior adapted to house a plurality of gears, a sensor, and an output shaft.

In one embodiment, the connector housing includes a hollow tube extending outwardly from the second side of the frame of the connector housing and into the interior of the gear and sensor housing.

In one embodiment, the sensor is seated on the tube of the connector housing and the plurality of gears are located in the interior of the tube of the connector housing.

In one embodiment, first and second sets of gears are mounted on first and second gear carriers respectively, the second gear carrier also defining an aperture adapted to receive a magnet.

In one embodiment, an internal drive arm is located in the aperture defined in the second carrier.

In one embodiment, the internal drive arm includes a plurality of arms adapted to be located in respective grooves defined in the second gear carrier.

In one embodiment, one of the connector housing and the motor housing includes a clip tab and the other of the connector housing and the motor housing includes a clip engaging with the clip tab for dipping the motor housing to the connector housing.

In one embodiment, one of the connector housing and the gear and sensor housing includes a clip tab and the other of the connector housing and the gear and sensor housing includes a clip engaging with the clip tab for clipping the gear and sensor housing to the connector housing.

The present invention is also directed to a rotary actuator defining a longitudinal axis and comprising a connector housing including a frame with opposed first and second sides and a hollow tube extending from the second side of the frame of the connector housing, the connector housing defining a central through aperture coo-linear with the longitudinal axis of the rotary actuator, a separate motor housing coupled and extending outwardly from the first side of the frame of the connector housing in a relationship co-linear with the longitudinal axis of the rotary actuator, a motor located in the interior of the motor housing and including a motor shaft and a motor pinion extending through the central through aperture in the frame of the connector housing in a relationship co-linear with the longitudinal axis of the rotary actuator, a separate gear and sensor housing coupled and extending outwardly from the second side of the connector housing, the tube of the connector housing extending into the interior of the gear and sensor housing and the gear and sensor housing extending in a relationship co-linear with the longitudinal axis of the rotary actuator, a sensor located in the interior of the gear and sensor housing and seated on the exterior of the tube of the connector housing in a relationship spaced from the longitudinal axis of the rotary actuator, first and second pluralities of gears mounted on first and second gear carriers respectively, the first and second pluralities of gears and the first and second gear carriers being located in the interior of the tube of the connector assembly, a magnet mounted on the second gear carrier in a relationship co-linear with the sensor, the sensor adapted to sense a change in the magnetic field generated by the magnet in response to rotation of the second gear carrier, a drive arm mounted on the second gear carrier, the drive arm including a plurality of arms extending into a respective plurality of grooves defined in the second gear carrier, and an output shaft coupled to the drive arm and extending through the interior of a collar on the gear and sensor housing.

In one embodiment, the motor pinion is coupled to the first plurality of gears and the first gear carrier is coupled to the second plurality of gears.

In one embodiment, each of the first and second gear carriers includes a plurality of posts for mounting the plurality of first and second gears respectively and the first gear carrier includes a wheel with a gear in coupling relationship with the second plurality of gears.

The present invention is further directed to a rotary actuator comprising a connector housing including a tube and defining a through aperture, a motor housing clipped to one side of the connector housing, a motor in the motor housing and including a motor shaft extending into the through aperture in the connector housing, a gear and sensor housing clipped to an opposite side of the connector housing, the tube extending into the gear and sensor housing and the motor shaft extending into the tube, at least a first gear and a first gear carrier in the interior of the tube that extends into the gear and sensor housing, the first gear engaging with the motor shaft, a sensor in the gear and sensor housing and seated on an exterior surface of the tube, a magnet housed in the first gear carrier, the sensor adapted for sensing changes in the magnetic field generated by the magnet in response to movement of the magnet, and an output shaft extending through a collar in the gear and sensor housing.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENT

Figure 1:
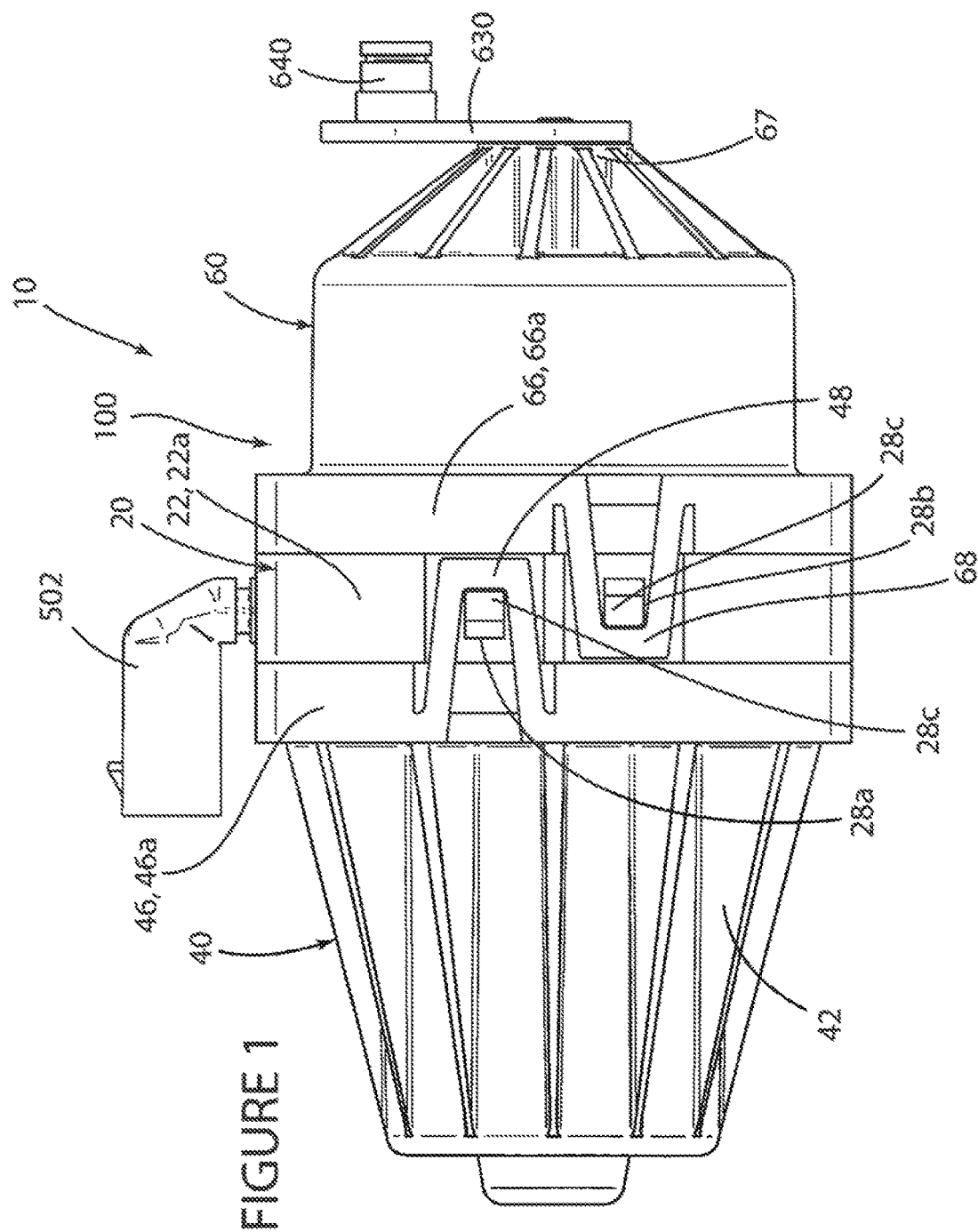
FIG. 1 is a side elevational view of a rotary actuator in accordance with the present invention.
Figure 2:
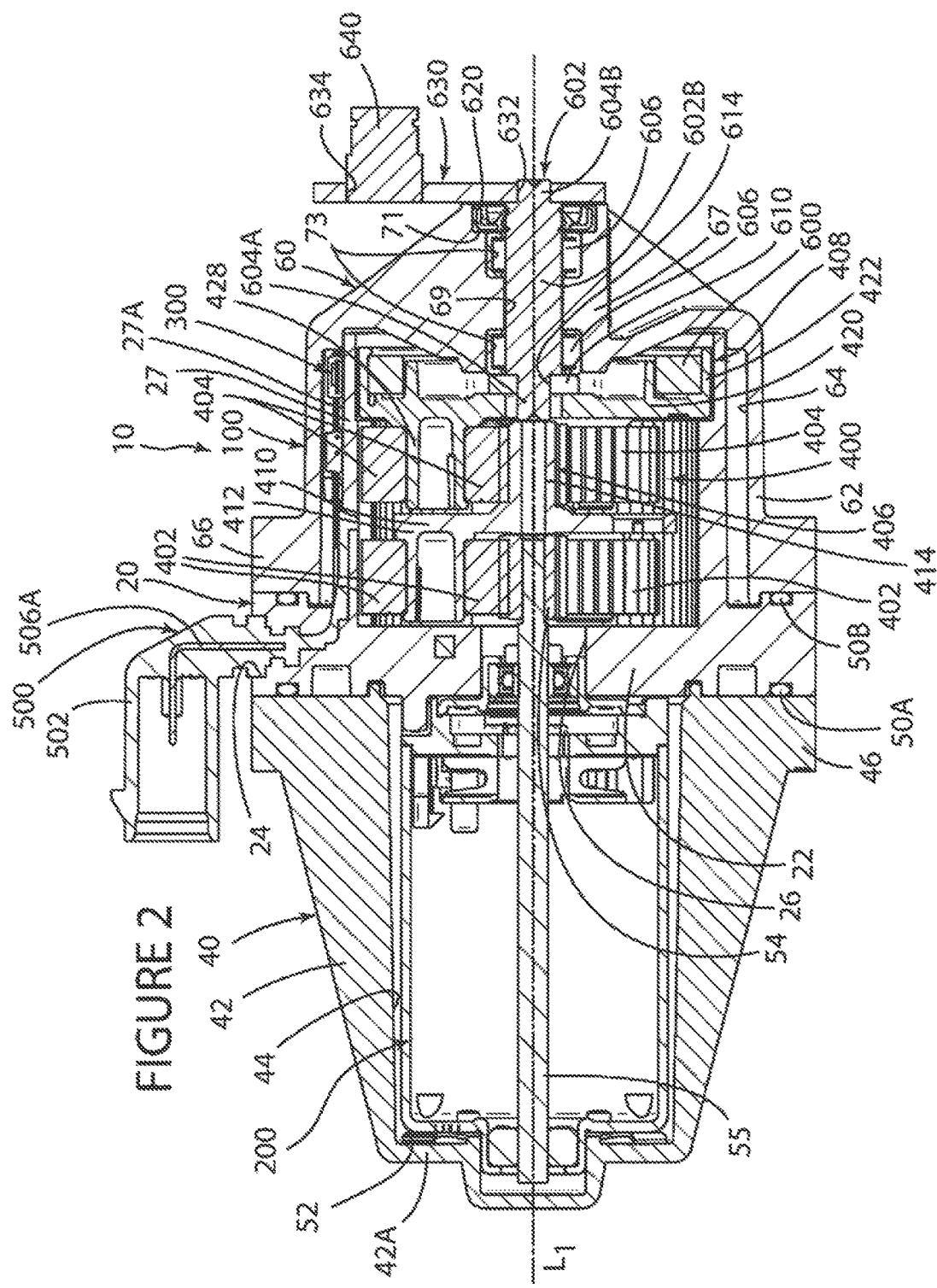
FIG. 2 is a vertical cross-sectional view of the rotary actuator shown in FIG. 1.
Figure 3:
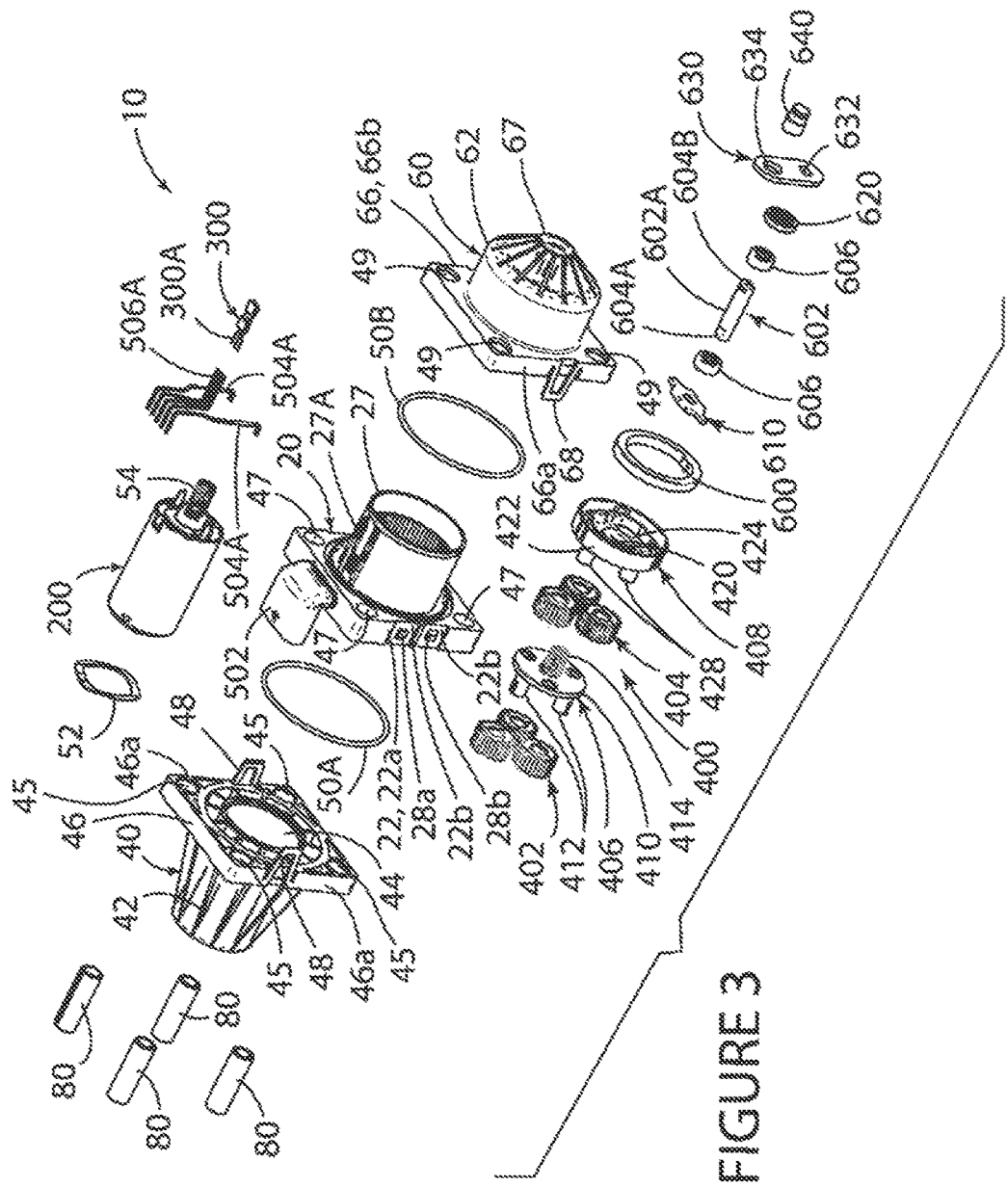
FIG. 3 is an exploded perspective view of the rotary actuator shown in FIGS. 1 and 2.

FIGS. 1, 2, and 3 depict a rotary actuator 10 in accordance with the present invention which comprises a housing 100 for a brushed electric DC motor 200, a sensor 300, and a gear assembly 400.

The actuator 10 can be used in a wide variety of applications to control the rotary motion of an apparatus or part coupled thereto including, for example, to control the rotary motion of the cross shaft (not shown) of a vehicle turbocharger assembly (not shown).

The housing 100 is comprised of three separate coupled modular components, namely a central connector housing 20, a hollow motor housing 40 that is clipped to one side of the connector housing 20, and a hollow gear/sensor/output housing 60 that is clipped to the opposed side of the connector housing 20.

The connector housing 20 includes a central bracket or frame 22 defining a top connector receiving recess or aperture 24, a central motor pinion through aperture or hole 26 co-linear with the longitudinal axis $L_1$ of the actuator 10, a cylindrically shaped hollow tube 27 that surrounds and is spaced from the through aperture 26 and extends generally unitarily normally outwardly from the side of the central frame 22 into the interior of the gear and sensor housing 60, and opposed vertical exterior side surfaces or faces 22a, each including a pair of spaced apart and parallel clip receiving tabs 28a and 28b located in respective recesses 22b defined in the respective faces 22a.

Further, in the embodiment shown, each of the clip tabs 28a and 28b includes an angled or sloped exterior surface or face 28c.

The motor housing 40 includes a circumferential exterior wall 42 with an interior cylindrical surface defining a hollow and generally cylindrical interior 44 and a peripheral circumferential bracket or frame 46 unitary with the open end of the wall 42 and including a pair of elongate clips 48 extending outwardly from the opposed sides exterior sides of the frame 46 in an offsetting, staggered, and parallel relationship and adapted for mounting the motor housing 40 to one side of the frame 22 of the connector housing 20 in a relationship with the clips 48 on the motor housing 40 engaging with and clipped to respective ones of the clip tabs 28a and 28b on the respective opposed side faces 22a of the frame 22 of the connector housing 20 for removably securing the motor housing 40 to the connector housing 20.

In the embodiment shown, each of the clips 48 is in the form of a flexible elongate finger or closed hook adapted to initially flex outwardly away from the connector frame 22 upon contact with the sloped exterior face 28c of the respective clip tabs 28a and 28b when the motor housing 40 is secured to the connector housing 100 and further is adapted to flex or snap back inwardly towards the connector frame 22 into a relationship extending into the respective recesses 22b defined in the exterior surfaces 22a and surrounding and clipped to the respective clip tabs 28a and 28b when the respective clips 48 clear the sloped exterior face 28c of the respective clip tabs 28a and 28b.

The electric motor 200, which is generally cylindrical in shape, is located and housed in the cylindrical hollow interior 44 of the motor housing 40 in a relationship co-linear with the longitudinal axis $L_1$ of the actuator 10.

A housing sealing O-ring 50A is disposed between the frames 22 and 46 of the connector housing 20 and the motor housing 40 respectively for sealing the motor 200 in the motor housing 40.

A wave spring 52 is located and housed in the interior 44 of the motor housing 40 between the back of the motor 200 and the back vertical wall 42A of the motor housing 40. A toothed rotatable motor pinion 54 is coupled to the distal end of an elongate rotatable motor shaft 55 that extends from the interior of the motor 200. The pinion 54 extends outwardly from the front of the motor 200 and through the central aperture 26 defined in the frame 22 of the connector housing 20 and into the interior of the gear/sensor housing 60. The motor shaft 55 and motor pinion 54 extend in a relationship co-linear with the longitudinal axis $L_1$ of the rotary actuator 10.

The use of separate and modular connector and motor housings 20 and which are clipped together and, more specifically, the use of a motor housing that is separate from and independent of the connector housing 20 and the gear and sensor housing 60 allows for the substitution of differently sized motor housings 40 to accommodate differently configured and sized motors depending upon the particular application.

The sensor/gear housing 60 includes a circumferential exterior wall 62 with a circumferential interior surface defining a hollow generally cylindrical interior 64 and a peripheral circumferential bracket or frame 66 unitary with one end of the sensor/gear housing 60 and including opposed clips 68 that are identical in structure and function to the clips 48, extend outwardly from opposed exterior side surfaces or faces 66a and 66b of the frame 66 in an offsetting, staggered, and parallel relationship to each other and are adapted for clipping and securing the sensor/gear housing 60 to the frame 22 of the connector housing 20 in a relationship with the clips 68 on the sensor/gear housing 60 extending into the respective recesses 22b defined in the respective exterior surfaces 22a and engaging with and against respective ones of the dip tabs 28a and 28b on the frame 22 of the connector housing 20 to removably secure the sensor/gear housing 60 to the connector housing 20.

In the embodiment shown, the respective clips 48 and 68 are disposed relative to each other in a spaced-apart and parallel relationship and further in a relationship spaced and parallel to the longitudinal axis $L_1$ of the actuator 10.

The sensor/gear housing 60 further includes a distal interior collar 67 that is located at the end of the housing 60 opposite the end thereof with the frame 66, is disposed in a relationship co-linear with the longitudinal axis $L_1$ of the actuator 10, and defines a central through-hole 69 co-linear with the longitudinal axis $L_1$ of the actuator 10.

A distal interior circumferential recess 71 extends into the collar 67 from the interior surface thereof defining the central through-hole 689, and a pair of interior circumferential spaced apart and parallel interior grooves 73 extends inwardly into the interior collar 67 from the interior surface defining the central through-hole 69.

Thus, in the embodiment shown, the motor housing 40 and the sensor/gear housing 60 are located on and coupled to opposite sides of the central connector housing 20 in a diametrically opposed relationship co-linear with the longitudinal axis $L_1$ of the actuator 10 and, more specifically, the motor housing 40 and the sensor/gear housing 60 extend outwardly from opposite sides of, and in a relationship generally normal to, the central frame 22 of the connector housing 20 with the tube 27 of the frame 22 of the connector housing being located co-linear with the actuator longitudinal axis $L_1$ and extending through the hollow interior 64 of the sensor/gear housing 60.

Another housing sealing O-ring 50B is disposed between the respective frames 22 and 66 of the connector housing 20 and the gear/sensor housing 60 respectively.

The use of separate and modular connector and gear/sensor/output housings 20 and 60 and, more specifically, the use of a separate gear/sensor/output housing 60 that can be clipped to the connector housing 20 separately from and independent of the connector housing 20 and the motor housing 40, allows for differently sized gear/sensor/output housings 60 to be substituted to accommodate different output shaft configurations depending upon the particular application.

Additionally, connector housing 20 allows for the alignment and maintenance of concentricity between the motor 200 in the motor housing 40 and the planetary gears 402 and 404 in the gear/sensor/output housing 60 and eliminates the stack up of tolerances.

Cylindrical mounting inserts 80 extend through respective aligned apertures or through-holes 45, 47, and 49 defined respectively in the flange or frame 46 of the motor housing 40, the flange or frame 22 of the connector housing 20, and the flange or frame 66 of the sensor/gear housing 60 respectively for mounting the actuator 10 in the engine compartment of a vehicle (not shown) via respective fasteners or bolts (not shown).

The actuator 10 further comprises an electrical connector assembly 500 including a connector 502 including an end coupled to and extending into the top connector recess 24 defined in the top of the frame 22 of the connector housing 20. A pair of motor terminals 504A extend through the interior of the connector 502, through the interior of the frame 22 of the connector housing 20 and into electrical coupling relationship with the motor 200. Three sensor terminals 506A also extend through the interior of the connector 502 into the frame 22 of the connector housing 20 and then into the connector housing 20 and, more specifically, into a groove 27A defined in the top of the tube 27 of the frame 22 of the connector housing 20.

The sensor 300, which in the embodiment shown is in the form of a Hall effect sensor and Includes a sensor lead frame with three terminals 300A extending therefrom, is located in the sensor/gear housing 60 in a relationship with the terminals 300A extending in the groove 27A in the top of the tube 27 of the frame 22 of the connector housing 20 and coupled to the respective ends of the three respective sensor terminals 506A and the sensor 300 seated in the groove 27A on the top of the tube 27 of the frame 22 of the connector housing 20.

The elements of the gear assembly 400 are located and housed in the interior 64 of the sensor/gear housing 60 and, more specifically, are located and housed in the interior of the tube 27 of the frame 22 of the connector housing 20.

The gear assembly 400 includes first and second pluralities of toothed cylindrical planet gears 402 and 404. The embodiment shown includes three gears 402 and three gears 404.

The gear assembly 400 further includes a carrier 406 for the gears 402 and a carrier 408 for the gears 404.

The gear carrier 406 includes a central wheel 410, three posts 412 extending normally outwardly from one exterior surface of the wheel 410 and spaced at 120 degrees from each other, and a central toothed planetary gear 414 extending normally outwardly from the opposite exterior surface of the wheel 410. The respective gears 402 are mounted for rotation on and relative to the respective posts 412 of the gear carrier 406.

The gear carrier 408 includes a circular base 420 with a circumferentially extending peripheral wall or flange 422 defining a hollow interior 424 and a pair of interior recesses or grooves 426. Three posts 428 extend normally outwardly from one side of the base 420 and the circumferentially extending peripheral wall or flange 422 extends normally outwardly from the other side of the base 420. The respective gears 404 are mounted on the respective posts 428 of the gear carrier 406.

A ring-shaped magnet 600 is located and housed in the interior of the gear carrier 408 in a relationship with the exterior surface of the magnet 600 abutted against the interior surface of the peripheral flange 422 of the gear carrier 408.

The gear carrier 406 with the gears 402 mounted thereon is located in the interior 64 of the gear/sensor housing 60 and, more specifically, in the interior of the tube 27 of the connector housing 20 extending into the interior 64 of the gear/sensor housing 60 with the gears 402 located opposite and spaced from the exterior wall of the frame 22 of the connector housing 20 with the motor pinion gear 54 in toothed engagement with the respective gears 402 of the gear carrier 406.

The gear carrier 408 with the gears 404 mounted thereon is located in the interior 64 of the gear/sensor housing 60 and, more specifically, in the interior of the tube 27 of the connector housing 20 extending into the interior 64 of the gear/sensor housing 60 with the gears 404 located opposite and spaced from the exterior surface of the wheel 410 of the gear carrier 406 and the central planet gear 414 extending from the wheel 410 of the gear carrier 406 co-linearly with the longitudinal axis $L_1$ of the actuator 10 and in toothed engagement with the respective gears 404 of the gear carrier 408.

Moreover, the gear carrier 408 is located in a relationship with the magnet 600 co-linearly aligned with the sensor 300 in the vertical direction normal to the direction of the longitudinal axis $L_1$ and the wall of the tube 27 located between and separating the magnet 600 from the sensor 300.

Figure 4:
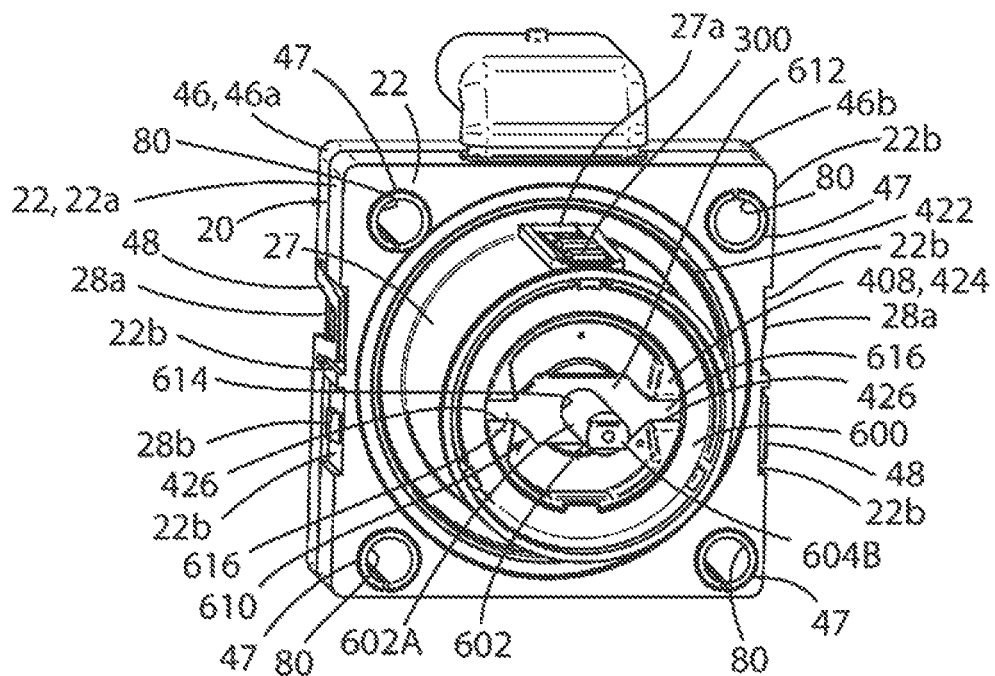
FIG. 4 is a part perspective, part side elevational view of the rotary actuator of FIG. 1 with the sensor/gear housing removed therefrom.
Figure 5:
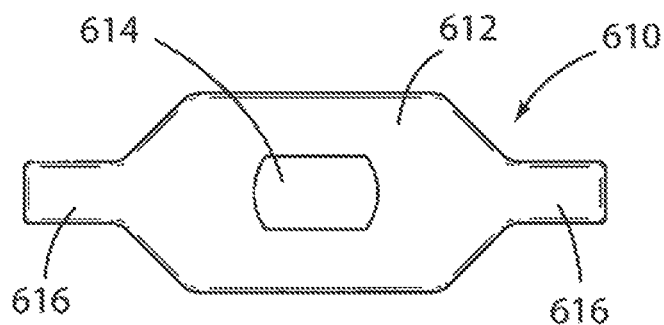
FIG. 5 is a side elevational view of the drive arm of the rotary actuator.

Referring to FIGS. 2, 3, and 4, an elongate output shaft 602 extends through the hollow interior 69 of the collar 67 of the gear/sensor housing 60 in a relationship co-linear with the longitudinal axis $L_1$ of the actuator 10. The output shaft 602 includes a cylindrical body 602A and a pair of opposed double D shaped distal ends 604A and 604B. Respective bearings 606 are located in the respective circumferential collar grooves 73 and mount the respective ends 604a and 604b of the shaft 602, and thus the shaft 602, for rotation in and relative to the Interior collar 67.

Referring to FIGS. 2, 3, and 4, an internal drive arm 610 includes a central base 612 defining a central double D-shaped through-aperture 614 and a pair of diametrically opposed arms 616 extending outwardly from opposed ends of the base 612. The drive arm 610 is located in the interior 424 of the gear carrier 408 with the respective arms 616 seated in the respective interior grooves 426 defined in the interior 424 of the gear carrier 408 and the end 604A of the output shaft 602 extending through the central through aperture 614 and providing a double-D press fit between the drive arm 610 and the output shaft 602.

A ring shaped lip seal 620 is located in the recess 71 defined in the front of the collar 67 of the gear/sensor housing 60.

An external drive arm 630 is coupled to the end 604B of the output shaft 602. The external drive arm 630 is generally oval shaped and defines a pair of diametrically opposed through-holes 632 and 634. The end 604B of the output shaft 602 extends through the through-hole 632.

A generally cylindrically shaped drive arm output stud 640 is coupled to the external drive arm 630 and more specifically is coupled to and extends into the through-hole 634 of the external drive arm 630.

In the embodiment shown, the motor shaft 55, the motor pinion 54, the gear 414 on the gear carrier 406, and the output shaft 602 are all disposed in a co-linear relationship relative to each other and the longitudinal axis $L_1$ of the rotary actuator 10. Moreover, in the embodiment shown, the longitudinal axis $L_1$ of the rotary actuator 10 defines the central longitudinal axis of the motor housing 40, the motor 200, the motor pinion 54, the gear 406, the gear/sensor housing 60, and the output shaft 602 and further defines the central axis of the connector housing 20, the gear carrier 406, the gear carrier 408, and the internal drive arm 610.

During operation, activation of the motor 200 results in the rotation of the motor shaft 55 which in turn results in the rotation of the motor pinion 54 which in turn results in the rotation of the gear carrier 406 by virtue of the toothed engagement of the motor pinion 54 with the planetary gears 402 which in turn results in the rotation of the gear 414 on the gear carrier 406 which in turn results in the rotation of the gear/magnet carrier 408 by virtue of the toothed engagement of the gear 414 with the planetary gears 404 on the gear/magnet carrier 408 which in turn results in the rotation of the internal drive arm 610 which in turn results in the rotation of the output shaft 602 which in turn results in the movement and rotation of the external drive arm 630 which in turn results in the movement or rotation or activation of a vehicle engine component (not shown).

During operation, the Hall effect sensor 300 is adapted to sense changes in the magnetic field generated by the magnet 600 in response to rotation of the gear/magnet carrier 408 thus allowing for the position of the gear/magnet carrier 408 and thus the position of the output shaft 602 and the external drive arm 630 to be determined and controlled.

Numerous variations and modifications of the embodiment described above may be effected without departing from the spirit and scope of the novel features of the invention. It is thus understood that no limitations with respect to the rotary actuator illustrated herein are intended or should be inferred. It is, of course, intended to cover by the appended claims all such modifications as fall within the scope of the claims.

We claim:

1. A rotary actuator comprising:
a connector housing including a frame;
a separate motor housing secured and extending outwardly from a first side of the frame of the connector housing and defining an interior adapted to house a motor; and
a separate gear and sensor housing secured and extending outwardly from a second side of the frame of the connector housing opposed to the first side of the frame of the connector housing and defining an interior adapted to house a plurality of gears, a sensor, and an output shaft; and
clips on the respective motor housing and the gear and sensor housing for securing the motor housing and the gear and sensor housing to the frame of the connector housing.

2. The rotary actuator of claim 1 further comprising a hollow tube in the interior of the gear and sensor housing, the sensor being seated on the tube and the plurality of gears being located in the interior of the tube.

3. A rotary actuator comprising:
a connector housing including a frame;
a separate motor housing secured and extending outwardly from a first side of the frame of the connector housing and defining an interior adapted to house a motor; and
a separate gear and sensor housing secured and extending outwardly from a second side of the frame of the connector housing opposed to the first side of the frame of the connector housing and defining an interior adapted to house a plurality of gears, a sensor, and an output shaft;
wherein the connector housing includes a hollow tube extending outwardly from the second side of the frame of the connector housing and into the interior of the gear and sensor housing and the sensor is seated on the tube of the connector housing and the plurality of gears are located in the interior of the tube of the connector housing.

4. A rotary actuator comprising:
a connector housing including a frame;
a separate motor housing secured and extending outwardly from a first side of the frame of the connector housing and defining an interior adapted to house a motor; and
a separate gear and sensor housing secured and extending outwardly from a second side of the frame of the connector housing opposed to the first side of the frame of the connector housing and defining an interior adapted to house a plurality of gears, a sensor, and an output shaft; and
wherein the plurality of gears comprises first and second sets of gears mounted on first and second gear carriers respectively, the second gear carrier also defining an interior adapted to receive a magnet.

5. The rotary actuator of claim 4 further comprising an internal drive arm located in the aperture defined in the second carrier.

6. The rotary actuator of claim 5 wherein the internal drive arm includes a plurality of arms adapted to be located in respective grooves defined in the second gear carrier.

* * * * *